United States Patent
Sales, Jr. et al.

(10) Patent No.: US 9,376,932 B2
(45) Date of Patent: *Jun. 28, 2016

(54) TURBOENGINE WATER WASH SYSTEM

(71) Applicant: EcoServices, LLC, Wethersfield, CT (US)

(72) Inventors: Hubert E. Sales, Jr., Houston, TX (US); Peter Asplund, Hasselby (SE)

(73) Assignee: EcoServices, LLC, Wethersfield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,528

(22) Filed: Dec. 4, 2013

(65) Prior Publication Data
US 2014/0083466 A1  Mar. 27, 2014

Related U.S. Application Data

(63) Continuation of application No. 11/644,784, filed on Dec. 22, 2006, now Pat. No. 8,628,627, which is a continuation-in-part of application No. 10/536,002, filed as application No. PCT/EP2004/000922 on Jun. 14, 2004, now Pat. No. 7,297,260.

(51) Int. Cl.
| | |
|---|---|
| *B08B 9/093* | (2006.01) |
| *F01D 25/00* | (2006.01) |
| *B08B 3/02* | (2006.01) |
| *B08B 9/00* | (2006.01) |

(52) U.S. Cl.
CPC ............... *F01D 25/002* (2013.01); *B08B 3/02* (2013.01); *B08B 9/00* (2013.01)

(58) Field of Classification Search
CPC ...................................................... B08B 9/096
See application file for complete search history.

(56) References Cited

U.S. PATENT DOCUMENTS

| | | |
|---|---|---|
| 1,834,534 A | 12/1931 | Richards et al. |
| 1,890,156 A | 12/1932 | Konig |

(Continued)

FOREIGN PATENT DOCUMENTS

| | | |
|---|---|---|
| CA | 2506174 A1 | 12/2005 |
| CH | CH341262 A | 9/1959 |

(Continued)

OTHER PUBLICATIONS

International Search Report and Written Opinion from PCT Application Serial No. PCT/SE2004/000922; Dated Jan. 13, 2005, 5 pages.

(Continued)

*Primary Examiner* — Jason Ko
(74) *Attorney, Agent, or Firm* — Kinney & Lange, P.A.

(57) ABSTRACT

A system for cleaning gas turbine engines is described. More specifically, methods and apparatuses for cleaning stationary gas turbines and on-wing turbofan engines found on aircraft are disclosed that includes a trailer-mounted, automated low-pressure water delivery system, additive and detergent injection system, nozzle and manifold technology, and active waste water effluent collector system. The system will deliver the liquid cleaning medium at a specific pressure, temperature, and flow rate to optimize the atomization that occurs at the nozzles.

17 Claims, 11 Drawing Sheets

(56) References Cited

U.S. PATENT DOCUMENTS

| | | |
|---|---|---|
| 1,926,924 A | 9/1933 | Sylvan |
| 2,760,597 A | 8/1956 | Brixius |
| 2,804,903 A | 9/1957 | Davies |
| 2,862,222 A | 12/1958 | Cockrell |
| 2,878,892 A | 3/1959 | Field |
| 2,922,173 A | 1/1960 | Lind et al. |
| 3,219,188 A | 11/1965 | Hirs |
| 3,263,341 A | 8/1966 | Allen |
| 3,335,916 A | 8/1967 | Juniper |
| 3,384,239 A | 5/1968 | Berardi |
| 3,481,544 A | 12/1969 | Jackson |
| 3,502,215 A | 3/1970 | Cahan |
| 3,527,030 A | 9/1970 | Hungate |
| 3,533,395 A | 10/1970 | Yaste |
| 3,550,778 A | 12/1970 | Kesselman |
| 3,564,820 A | 2/1971 | Nelson |
| 3,572,030 A | 3/1971 | Cuff |
| 3,601,832 A | 8/1971 | Cook |
| 3,612,075 A | 10/1971 | Cook |
| 3,616,623 A | 11/1971 | Reid |
| 3,623,668 A | 11/1971 | Freid et al. |
| 3,646,980 A | 3/1972 | Peterson |
| 3,766,719 A | 10/1973 | McAnally, III |
| 3,774,625 A | 11/1973 | Wiltrout |
| 3,835,498 A | 9/1974 | Arato |
| 3,911,938 A | 10/1975 | Wiltrout |
| 3,923,658 A | 12/1975 | Lancaster |
| 3,938,972 A | 2/1976 | Sugimura |
| 4,029,114 A | 6/1977 | Wiltrout |
| 4,059,123 A | 11/1977 | Bartos et al. |
| 4,065,322 A | 12/1977 | Langford |
| 4,158,449 A | 6/1979 | Sun et al. |
| 4,168,232 A | 9/1979 | Allen et al. |
| 4,191,348 A | 3/1980 | Holwerda |
| 4,196,020 A | 4/1980 | Hornak et al. |
| 4,225,188 A | 9/1980 | McGuire et al. |
| 4,234,323 A | 11/1980 | Maher |
| 4,300,918 A | 11/1981 | Cary |
| 4,378,755 A | 4/1983 | Magnusson et al. |
| 4,439,241 A | 3/1984 | Ault et al. |
| 4,462,192 A | 7/1984 | Fisher |
| 4,530,707 A | 7/1985 | Ovard |
| 4,543,108 A | 9/1985 | Wurz |
| 4,557,740 A | 12/1985 | Smith |
| 4,642,192 A | 2/1987 | Heskett |
| 4,652,368 A | 3/1987 | Ennis et al. |
| 4,684,379 A | 8/1987 | Gambrell |
| 4,713,120 A | 12/1987 | Hodgens, II et al. |
| H535 H | 10/1988 | Sam et al. |
| 4,802,901 A | 2/1989 | Wurz et al. |
| 4,834,912 A | 5/1989 | Hodgens, II et al. |
| 4,975,101 A | 12/1990 | Swanborn |
| 5,011,540 A | 4/1991 | McDermott |
| 5,018,355 A | 5/1991 | Foster |
| 5,090,588 A | 2/1992 | VanRomer et al. |
| 5,093,012 A | 3/1992 | Bundy et al. |
| 5,114,098 A | 5/1992 | Campbell |
| 5,137,555 A | 8/1992 | Fewel, Jr. |
| 5,160,430 A | 11/1992 | Gasser et al. |
| 5,193,976 A | 3/1993 | Kolev et al. |
| 5,268,011 A | 12/1993 | Wurz |
| 5,269,823 A | 12/1993 | Wurz |
| 5,273,395 A | 12/1993 | McDermott |
| 5,318,254 A | 6/1994 | Shaw et al. |
| 5,330,579 A | 7/1994 | Rushing et al. |
| 5,354,014 A | 10/1994 | Anderson |
| 5,374,352 A | 12/1994 | Pattee |
| 5,454,533 A | 10/1995 | Grant et al. |
| 5,458,299 A | 10/1995 | Collins et al. |
| 5,462,655 A | 10/1995 | Ladd et al. |
| 5,464,459 A | 11/1995 | VanBuskirk et al. |
| 5,490,646 A | 2/1996 | Shaw et al. |
| 5,498,329 A | 3/1996 | Lamminen et al. |
| 5,507,306 A | 4/1996 | Irvine et al. |
| 5,556,535 A | 9/1996 | Van Der Est |
| 5,560,782 A | 10/1996 | Latimer |
| 5,618,353 A | 4/1997 | Irvine et al. |
| 5,669,982 A | 9/1997 | Latimer |
| 5,725,611 A | 3/1998 | Wright et al. |
| 5,868,860 A | 2/1999 | Asplund |
| 5,899,217 A | 5/1999 | Testman, Jr. |
| 5,972,062 A | 10/1999 | Zimmermann |
| 6,017,377 A | 1/2000 | Brown et al. |
| 6,021,792 A | 2/2000 | Petter et al. |
| 6,062,486 A * | 5/2000 | Hill .................................. 239/1 |
| 6,073,637 A | 6/2000 | Hayward et al. |
| 6,080,225 A | 6/2000 | Forster |
| 6,155,277 A | 12/2000 | Barry |
| 6,164,298 A | 12/2000 | Petter et al. |
| 6,310,022 B1 | 10/2001 | Amiran |
| 6,394,108 B1 | 5/2002 | Butler |
| 6,402,855 B1 | 6/2002 | Damron et al. |
| 6,470,668 B2 | 10/2002 | Payling et al. |
| 6,478,033 B1 | 11/2002 | Foster |
| 6,484,508 B2 | 11/2002 | Rocklin et al. |
| 6,491,048 B1 | 12/2002 | Foster |
| 6,503,334 B2 | 1/2003 | Ruiz et al. |
| 6,553,768 B1 | 4/2003 | Trewin et al. |
| 6,565,758 B1 | 5/2003 | Thomas |
| 6,630,198 B2 | 10/2003 | Ackerman et al. |
| 6,675,437 B1 | 1/2004 | York |
| 6,883,527 B2 | 4/2005 | Travaly et al. |
| 6,932,093 B2 | 8/2005 | Ogden et al. |
| 6,964,699 B1 | 11/2005 | Carns et al. |
| 7,018,965 B2 | 3/2006 | Yan et al. |
| 7,065,955 B2 | 6/2006 | Reback et al. |
| 7,150,431 B2 | 12/2006 | Dennis |
| 7,185,663 B2 | 3/2007 | Koch et al. |
| 7,198,052 B2 | 4/2007 | Watt |
| 7,297,260 B2 | 11/2007 | Hjerpe et al. |
| 2001/0039794 A1 | 11/2001 | Rocklin et al. |
| 2002/0001255 A1 | 1/2002 | Flood et al. |
| 2002/0088480 A1 | 7/2002 | Woodmansee et al. |
| 2002/0092423 A1 | 7/2002 | Gillingham et al. |
| 2003/0209256 A1 | 11/2003 | Tadayon |
| 2005/0199270 A1 | 9/2005 | Watt |
| 2005/0199271 A1 | 9/2005 | Watt |
| 2006/0048796 A1 | 3/2006 | Asplund et al. |
| 2006/0060218 A1 | 3/2006 | Lakdawala et al. |
| 2006/0060233 A1 | 3/2006 | Lakdawala et al. |
| 2006/0081521 A1 | 4/2006 | Hjerpe et al. |
| 2006/0219269 A1 | 10/2006 | Rice et al. |
| 2006/0243308 A1 | 11/2006 | Asplund et al. |
| 2007/0000528 A1 | 1/2007 | Asplund et al. |
| 2007/0048127 A1 | 3/2007 | O'Neill et al. |
| 2007/0059159 A1 | 3/2007 | Hjerpe |
| 2008/0040872 A1 | 2/2008 | Hjerpe |
| 2008/0149141 A1 | 6/2008 | Sales |
| 2008/0178909 A1 | 7/2008 | Alvestig et al. |
| 2008/0216873 A1 | 9/2008 | Hjerpe et al. |
| 2009/0050183 A1 | 2/2009 | Rice et al. |

FOREIGN PATENT DOCUMENTS

| | | |
|---|---|---|
| CN | 1085176 A | 4/1994 |
| CN | 2597335 Y | 1/2004 |
| DE | 2701823 A1 | 8/1977 |
| DE | 9420362 U1 | 3/1995 |
| EP | 0262097 A2 | 3/1988 |
| EP | 0628477 A1 | 12/1994 |
| EP | 1205640 A2 | 5/2002 |
| EP | 1225307 A2 | 7/2002 |
| GB | 2074048 A | 10/1981 |
| JP | 06171600 A | 6/1944 |
| JP | S52109769 A | 9/1977 |
| JP | H03501360 A | 3/1991 |
| JP | 06211198 A | 8/1994 |
| JP | 11137938 A | 5/1999 |
| JP | H11507583 A | 7/1999 |
| JP | 2000136702 A | 5/2000 |
| JP | 2000161081 A | 6/2000 |
| JP | 2002242613 A | 8/2002 |
| JP | 2002256889 A | 9/2002 |
| KR | 19980017193 A | 6/1998 |

(56) References Cited

FOREIGN PATENT DOCUMENTS

| KR | 100331311 B1 | 3/2002 |
| SU | 1755965 A1 | 8/1992 |
| WO | WO92/14557 A1 | 9/1992 |
| WO | WO96/40453 A1 | 12/1996 |
| WO | WO2004/055334 A1 | 7/2004 |
| WO | WO2005/024096 A1 | 3/2005 |
| WO | WO2005/028119 A1 | 3/2005 |
| WO | WO2005/077554 A1 | 8/2005 |
| WO | WO2005/121501 A2 | 12/2005 |

OTHER PUBLICATIONS

"Engine Washing", from <http://www.aviationtoday.com/am/categories/bga/Engine-Washing_5248.html>, Oct. 1, 2006, 4 pages.

Extended European Search Report from EP Application Serial No. 10169653.2, dated Oct. 5, 2011, 5 pages.

Canadian Office Action from Application Serial No. 2,570,243, dated Dec. 3, 2010, 3 pages.

Japanese Office Action from Application Serial No. 2010-205931, dated Aug. 2, 2011, 3 pages.

* cited by examiner

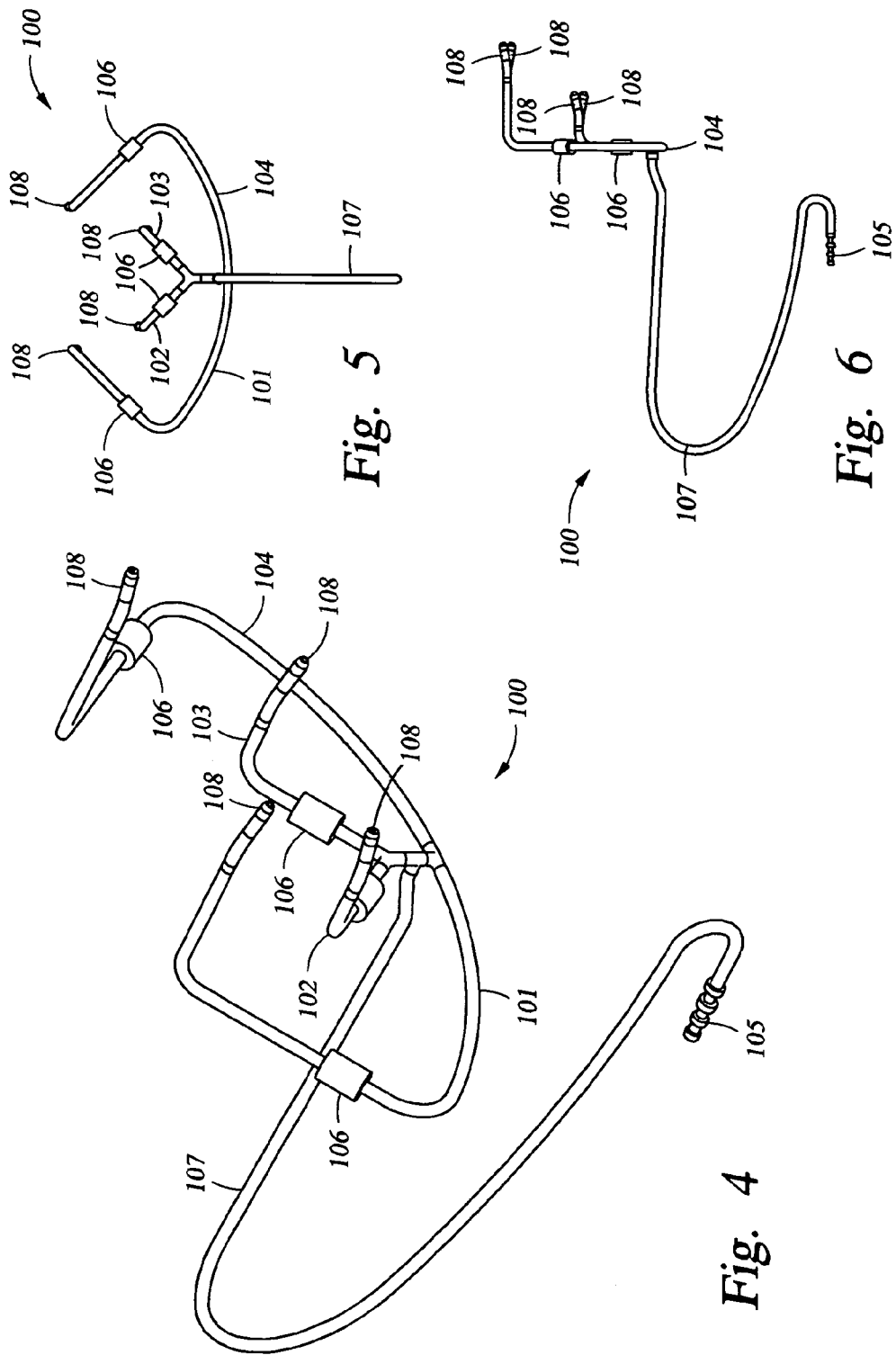

TURBOENGINE WATER WASH SYSTEM

CROSS-REFERENCES TO RELATED APPLICATIONS

This application is a continuation of application Ser. No. 11/644,784, which is a continuation-in-part of application Ser. No. 10/536,002, which is a §317 national stage application of PCT/SE2004/000922.

FIELD OF THE INVENTION

This invention generally relates to a system for cleaning gas turbine engines, and more specifically, to methods and apparatuses for cleaning on-wing turbofan engines found on aircraft that includes, among other things, a trailer-mounted, automated low-pressure water delivery system, additive and detergent injection system, nozzle and manifold technology, and active waste water effluent collector system.

BACKGROUND OF THE INVENTION

A gas turbine is comprised of a compressor section for compressing ambient air, a combustor section for mixing and burning fuel and the compressed air, and a turbine section driven by the expanding combustion gases for powering the compressor and turning an output shaft for ancillary devices or power generation or for providing thrust for propelling an aircraft. In an aircraft application, one of these ancillary devices may be a large turbofan used to provide additional thrust for the aircraft.

Modern gas turbine engines require very large quantities of atmospheric air. Entrained in the air is particulate matter of various sizes and made up of many different substances, such as aerosolized salts, volatile organic compounds, smog particulate, dust, agricultural debris, pollen, hydrocarbons, insects, de-icing chemicals, and the like. Stationary gas turbines such as those used in power generation utilize air filtering mechanisms to remove the majority of the particulates. Even with this filtering, however, very small contaminants and foreign matter dissolved in the air humidity still remain in the airflow. Gas turbines on aircraft do not have any filtering system on the airflow—so all of the particulate matter enters the turbine. The majority of large particulate matter and debris entering an aircraft engine are centrifuged away from the gas turbine through the action of the turbofan; however some of this large particulate matter and debris may remain on the turbofan blades reducing their effectiveness. While most of the smaller particulate matter follows the gas path and becomes part of the engine exhaust, some of the particles will remain on the intake, compressor and gas path components of the engine. This remaining particulate matter is referred to as "fouling," and after a period of operation will build up on the engine components. Any large debris that is ingested through the turbofan, such as insects and birds, can also cause considerable immediate fouling of the intake and gas path components.

The fouling on the turbofan and compressor blades of the turbine causes a loss in the aerodynamic properties of these components. The air stream is deflected by the increased roughness of the blade surfaces, and the boundary layer of the air stream is thickened resulting in a negative vortex at the trailing edge of the blade. The deflection and vortex results in a loss of air mass flow through the engine thereby reducing engine performance. Secondary effects of this fouling include reduced compressor pressure gain, which leads to the engine operating at a reduced pressure ratio, and a reduction in the compressor isentropic efficiency. The overall effect of these negative effects, all caused by turbofan and compressor blade contamination, is that the engine will utilize more of the power it is generating to turn the compressor rather than producing thrust (in the case of an aircraft) or powering other ancillary systems (such as generators in a power generation application).

In an aircraft application, it is necessary to increase the throttle for more power to compensate for the lost thrust. In a stationary application, it is necessary to increase fuel flow to make up for the lost power. In both cases, operating costs increase as more fuel is required to perform the same amount of work. The increased fuel burn, in addition to increasing operating costs, has other deleterious effects:

First, the loss in performance caused by fouling causes a rise in the temperature at which the engine operates. This is most critical in aircraft engines since they operate at temperatures very close to the limit of what the engine material can withstand. The temperature is measured after combustion and is designated as the Exhaust Gas Temperature (EGT). The difference between the actual EGT and the safe operating limit established by the engine manufacturer is the EGT Operating Margin. As fouling takes place over time, the EGT rises to a point closer to the upper limit of the EGT Operating Margin. When the EGT is too close to the EGT Operating Margin, the engine must be removed from service and overhauled. In stationary power generation applications, the increase in engine operating temperature reduces the serviceable life of the gas turbine due to early component failure.

Second, fouling of the engine is harmful for the environment. Increased fuel burn increases emissions of gases known to cause global warming such as carbon dioxide. Each additional pound of fuel burned results in the emission of approximately 3.4 pounds of carbon dioxide. Increased combustion temperatures due to fouling also results in increased nitrogen oxides (NOx) known to cause smog.

In addition to the above described intake component fouling effects, fouling in the combustor and other post-compressor areas has negative effects on the engine. Debris in the air stream carried into the rear section of the engine increases the amount of ash and soot in the combustor, reducing its effectiveness and leading to potential corrosion of components.

Gas turbines, both in aircraft and stationary applications, can have many different designs but the above-described problem of airborne contaminants fouling the engine is common to all of them. There is a difference, however, in the types of fouling that occurs in the different sections of the engine. Most modern aircraft have a turbofan engine that is designed to provide thrust. The engine is comprised of a core fuel-burning gas turbine that drives a bypass fan. The fan is located upstream of the compressor and may be as large as 120 inches or more in diameter. The air being ingested into the engine first comes into contact with this bypass fan, and a portion of the airflow (known commonly as the "bypass ratio") is then forced under very high velocity around the core of the engine and out through the rear of the engine producing most of the thrust utilized to propel the aircraft. Due to centrifugal and inertial forces, most of the large particulates (including insects, bird residue, large dirt particles, etc.) in the air follow this path and subject the fan to fouling. Cleaning this fan is performed by a liquid cleaning medium generally using some form of impingement.

Downstream of the bypass fan is the core engine compressor. A core engine compressor is a component of all gas turbines (unlike the bypass fan which is only found on aircraft engines). The purpose of the compressor is to compress the air to high pressure ratios for maximum combustion efficiency.

Compressing the air takes place in a series of rows of decreasing size rotating blades and stationary vanes. The compression of the air leads to high pressure ratios and concurrent high temperatures that may exceed 900 degrees Fahrenheit. Most of the large particles of potential contaminants trapped in the airflow, as stated above, have either been filtered out through the use of filtering media or, in the case of turboaircraft, been centrifuged within the bypass fan area. Most of the remaining contaminants are very small particles in the airflow and other matter (such as aerosolized salts, for example) entrained in the humidity of the airflow. As the air is accelerated before the first stages of the compressor, according to the Bernoulli Effect, there is a corresponding initial temperature drop. This may cause some of the humidity to condense freeing the matter dissolved in the humidity. A portion of this freed matter strikes and adheres to the first rows of the compressor. The remaining freed matter mixes with the other fine particulate in the airflow. As the airflow continues through the compressor and the air is heated, this matter is subject to continued adhesion to the compressor blades and other gas path components causing additional fouling. The increasing heat may cause the fouling to be baked on to the blades. Typical fouling in the compressor section of gas turbines is salt, hydrocarbons, chemical residue, and other fine matter. This fouling is different than that generally found on the bypass blades and as such needs a different cleaning methodology. Where the bypass cleaning is accomplished by impingement of the cleaning medium on the bypass blades, the compressor cleaning is accomplished by reversing the process whereby the fouling was created in the first place. This process reversal is to re-entrain the particulate and fouling matter in a liquid medium which is then carried through the compressor and gas path and out the engine exhaust.

Removal of the aforedescribed contaminants from blades and vanes of in-service compressors is desirable to restore compressor and engine efficiency. Since it is both time-consuming and expensive to disassemble the engine from the aircraft and then the compressor from the engine, it is also desirable to remove the contaminants while the engine is on-wing. Furthermore, any method utilized to remove the contaminants must not interfere with the structural or metallurgical integrity of other components of the engine. In this regard, it is known in the art that contaminants can be removed from the internal components of a gas turbine engine by ingesting, into the engine inlet at dry-motoring or idle speed, substances generally characterized as aqueous cleaning compositions.

One of the early leaders in this field of cleaning aircraft engines is Juniper Aircraft Service Equipment of Liverpool, England. In the 1960's, they produced and patented one of the first gas turbine compressor washing units under U.S. Pat. No. 3,335,916. This patent discloses a mobile spray unit for use in the washing of compressor blades of gas turbine engines. The washing liquid is supplied under pressure through the use of a hand pump or through pressurized air provided by an external engine compressor connected to an air inlet to the unit. A flexible hose delivers the washing liquid from the mobile spray unit to the gas turbine engine. Improvements to this type of device have occurred, such as the mobile cart-mounted unit described in U.S. Pat. No. 4,059,123 to Bartos, et al. In contrast to the Juniper device described above, pressurization is achieved by the use of an integrally mounted air compressor driven by an internal combustion engine. In both of these devices, and others of a similar design using hand pumps or air pressure systems, the water pressure achieved is insufficient to atomize the washing liquid into a spray fine enough to get complete gas path penetration without having the liquid subjected to the centrifugal forces of the rotating components. A high pressure device described in U.S. Pat. No. 5,868,860 to Peter Asplund describes a wash system improvement that sought to improve on the existing low pressure systems by utilizing a high pressure electrically powered pump. This system specifies delivering the wash fluid at a pressure in excess of 50 bar (725 psi) in order to more finely atomize the wash fluid. The problem with this system is that the pressures utilized by this system are such that damage to the engine components may occur.

Many prior art methods exist for directing the washing liquid from the mobile units described above to the compressor components of the aircraft engines. For example, U.S. Pat. No. 4,196,020 to Hornak, et al. discloses a typical engine wash spray apparatus that is releasably connected to the leading edge of a gas turbine engine for dispersing a cleaning or rinsing fluid to the air intake area of the engine and on into the engines internal air flow path. The apparatus includes a manifold having a plurality of spray nozzles symmetrically disposed about the air intake of a combustion turbine engine. Water is sprayed under pressure from these nozzles into the inlet of the compressor during operation. The inlet air is used to carry the atomized water mist through the turbine. A similar system is disclosed by McDermott in U.S. Pat. No. 5,011,540. The McDermott patent discloses a manifold having a plurality of nozzles for mounting in front of the air intake of a combustion turbine. McDermott proposes that a cleaning solution be injected into the air intake as a cloud dispersed in the less turbulent air found at the periphery of the intake. McDermott asserts that dispersal in the less turbulent air improved cleaning. In each of these and all other spray apparatus art the nozzles being used on the manifold each deliver the cleaning fluid at the same flowrate and spray droplet size. This fails to account for the different types of fouling occurring on the different components of the engine, and water flowrate and spray droplet size needed to address these differences.

The wash water and engine effluent is often collected for treatment, rather than being expelled directly onto the underlying surface (such as the hangar floor). One such system is described in U.S. Pat. No. 5,899,217 to Testman. Testman describes an engine wash recovery system that is temporarily installed on an aircraft turbine engine to recover wash liquids and contaminants washed from the engine during engine cleaning operations. The apparatus basically comprises a collector, an engine exhaust duct, and a container. The collector is formed of a flexible, liquid-proof material which is removably secured beneath the engine housing of the aircraft, to capture wash liquids which spill from the housing. The duct is removably connected to the engine exhaust, to capture spray which has passed through the engine as the engine is turned over at a relatively low rpm to flush the fluid through the engine. Both the collector and the duct are connected to a container for recovering all liquids emanating from the engine and its housing during the wash process. The collector may include a forward extension to capture liquids which back up out of the engine intake or inlet, and a rearward extension which extends back to the exhaust. A more involved collector system is seen in U.S. Patent Application Publication No. US-2003/0209256-A1 which discloses a large jacket, wet suit, or cover that completely encases a turbojet or turbofan engine and a drum or 55 gallon barrel interconnected by hoses creating a jet engine cleaning system that confines the spraying, filtering, and collecting of chemical spray and toxic runoff to a confined system. These and all other collector systems are passive in nature; that is, they rely on the low-RPM exhaust of the engine to move the effluent. Very low engine RPM may cause the effluent spray to be too weak to enter or penetrate the collector or mist eliminator. At higher RPMs, any pressure drop or resistance along this path may lead to effluent being expelled around or in front of the collector or through leaks in the hoses or apparatus, or backed up in the tubing/hoses with resultant spillage.

Accordingly, there is a need for improved methods and apparatuses for cleaning gas turbine engines and collecting the resultant effluent to eliminate the constraints, limitations, and design drawbacks seen in the prior art and described above.

SUMMARY OF THE INVENTION

The present invention relates to a system for cleaning gas turbine engines, and more specifically, to methods and apparatuses for cleaning on-wing turbofan engines found on aircraft that includes, among other things, a trailer-mounted, automated low-pressure water delivery system, additive and detergent injection system, nozzle and manifold technology, and active waste water effluent collector system.

In one embodiment, the invention includes means for pressurizing an aqueous wash medium, means for incorporating additives and/or detergents into the wash medium, and one or more nozzles for delivering the wash medium into the engine. More specifically, the pressurization may be accomplished with an automated, low-pressure water delivery system operating from about 200 psi to about 725 psi, the additives and/or detergents are injected into the wash medium before or after pressurization, and the nozzles have unique characteristics as to droplet size, flowrate, and dispersion spray pattern.

The invention can also include means for actively, through suction of the engine exhaust airflow, collecting the aqueous wash medium after the medium transverses the engine. Likewise, the invention can include means for purging the wash medium from the engine cleaning apparatus, means for controlling the engine cleaning apparatus, and a portable power generator that can power the engine cleaning apparatus.

In another embodiment, the invention includes the steps of pressurizing an aqueous wash medium with an automated, low-pressure water delivery system operating from about 200 psi to about 725 psi, incorporating additives and/or detergents into the wash medium before or after pressurization, and delivering the wash medium into the engine with one or more nozzles, wherein the nozzles are arranged on a manifold array with each nozzle having unique characteristics as to droplet size, flowrate, and dispersion spray pattern.

Accordingly, several objects and advantages of the invention are:

(a) to provide delivery of the heated, as required, cleaning medium, with precise, automated injection of required additives such as detergents, emulsifiers, freeze depressants, corrosion inhibitors, and the like at the correct pressure and flow rate to insure nozzle-tip spray atomization at the ideal purity, droplet size, temperature, and flow rate within the manufacturer's specifications;

(b) to provide multiple nozzles on a single manifold per engine each with a specific orientation, droplet size, and water flow rate to provide maximum cleaning efficacy for the specific engine components towards which they are directed without exceeding manufacturer's specifications; and (c) to provide an active effluent collection system that supplements the engine exhaust with a powered suction to insure that all cleaning effluent is collected.

This complete self-contained system for the washing of gas turbine engines has the advantage of allowing for the exact delivery of cleaning solution dispersion and effluent collection in an automated format to exactly conform to the requirements of each engine being cleaned. Prior systems only address one area of the cleaning process. Prior systems are manually operated devices that cannot easily be regulated for the different requirements of different engines and applications. Prior systems do not deliver cleaning medium at the proper temperature as required. Prior systems do not have exact additive injection systems or variable dispersion processes at the nozzle manifold. Prior systems do not have an air purge system to flush the wash solution from the lines and nozzles to prevent line corrosion and contamination of the wash solution. And last, prior systems do not have an active effluent collection system to insure environmental safety through the complete collection of the hazardous waste effluent.

The foregoing has outlined rather broadly the features and technical advantages of the present invention so that the detailed description of the invention that follows may be better understood. Additional features and advantages of the invention will be described hereinafter, which form the subject of the invention. It should be appreciated by those skilled in the art that the conception and the specific embodiments disclosed might be readily used as a basis for modifying or designing other methods or apparatuses for carrying out the same turboengine water washing and cleaning purposes of the present invention and in related cleaning applications such as land-based, stationary power generation gas turbines. It should also be realized by those skilled in the art that such equivalent constructions do not depart from the spirit and scope of the invention as set forth herein.

BRIEF DESCRIPTION OF THE DRAWINGS

The accompanying drawings, which are incorporated in and form a part of the specification, illustrate the embodiments of the present invention, and, together with the description, serve to explain the principles of the invention. In the drawings:

FIGS. 4, 5, and 6 are several views of the manifold and nozzle technology;

It is to be noted that the drawings illustrate only typical embodiments of the invention and are therefore not to be considered limiting of its scope, for the invention will admit to other equally effective embodiments.

DETAILED DESCRIPTION OF THE INVENTION

In general, the present invention relates to methods and apparatuses for cleaning gas turbine engines. More specifically, the invention relates to methods and apparatuses for cleaning on-wing turbofan engines found on aircraft that includes, among other things, a trailer-mounted, automated low-pressure water delivery system, additive and detergent injection system, nozzle and manifold technology, and active waste water effluent collector system.

Figure 1:
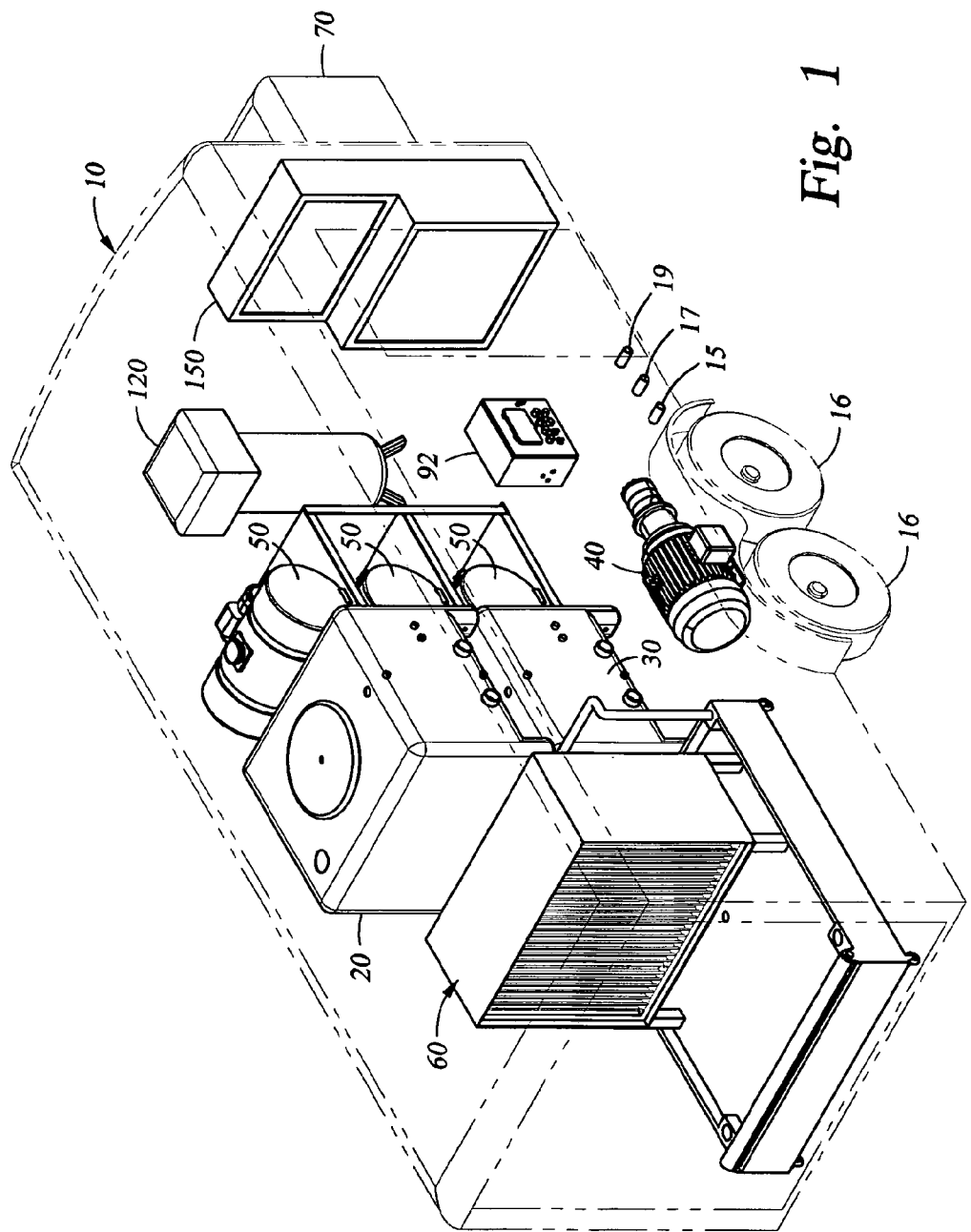
FIG. 1 is an isometric view of some of the components of the present invention mounted inside a trailer.
Figure 2:
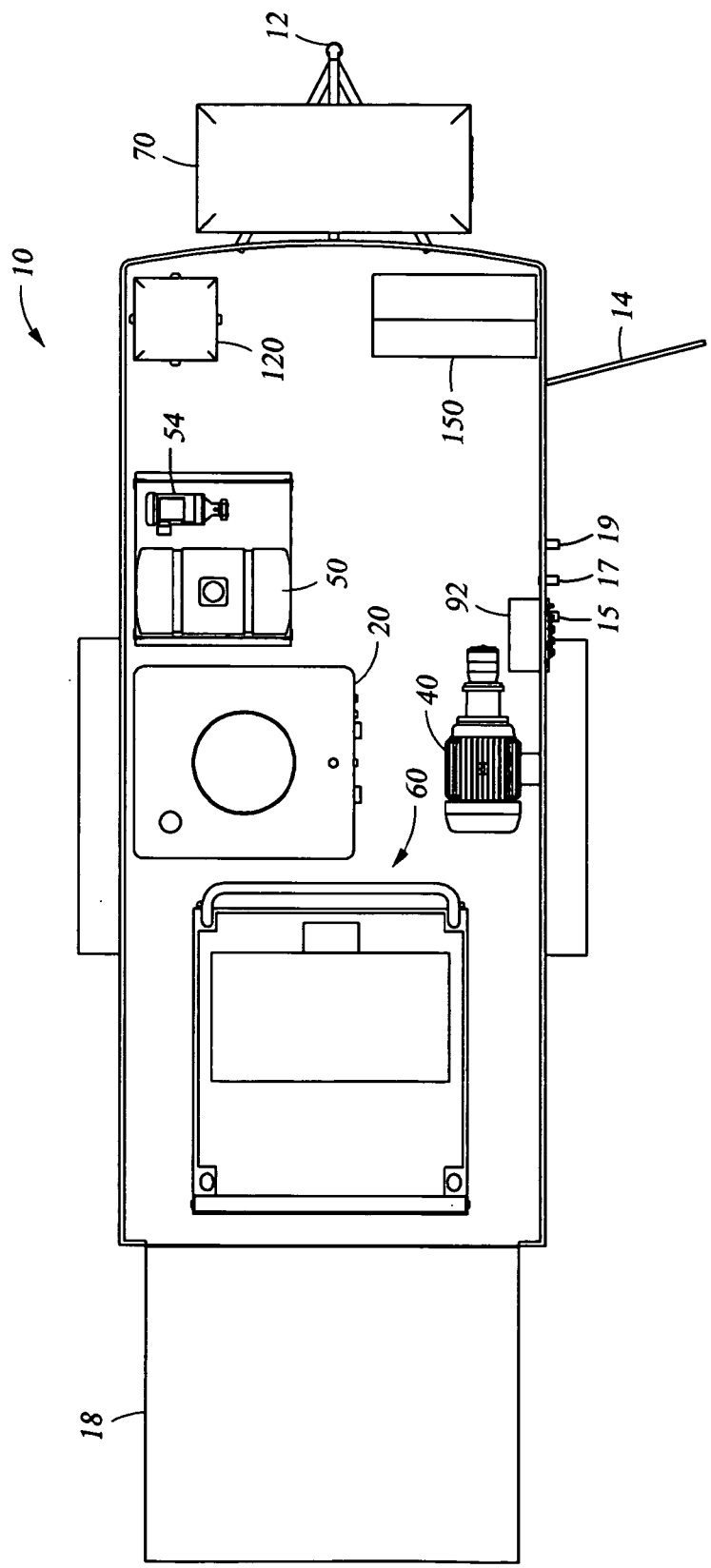
FIG. 2 is a top view of the inside of the trailer.

Turning now to FIGS. 1 and 2, there are shown, as an isometric view and top view, the principal components of the present invention, all of which have been mounted inside a trailer. In general, the water wash system includes a trailer 10, a clean water tank 20, a grey water tank 30, a wash pump 40, one or more additive/detergent tanks 50, a waste water effluent collector 60, a power generation system 70, an air compressor/purge system 120, and a mechanic's point-of-use supply cabinet 150.

The trailer 10 is a street-legal, enclosed, steel-framed trailer such as those made available from Pace American of Middlebury, Ind., one of the largest manufacturers of enclosed cargo and auto trailers in the world. Depending upon the size of the components, the trailer can range in size from about 4' wide×6' long to about 8.5° wide×53' in length, and can be enclosed, partially enclosed, or not enclosed at all. In addition, the trailer can include factory-installed options and accessories such as air conditioning units, living quarters, awnings, heaters, winches, TVs and sound systems, refrigerators, and other such items. Here, the trailer 10 is about 20 feet in length and includes a trailer hitch 12, one or more access or side doors 14, modular tires 16, and ramp door 18. While the components and machinery are all shown in one trailer, the separate components can be mounted on separate trailers (or grouped in different configurations and then mounted on different trailers) to allow for user versatility. Likewise, one or more of the components can be skid mounted. In addition, rather than using a trailer towed by a vehicle with a towing hitch, the components of the present invention could be mounted inside a tractor trailer rig. The use of a trailer is only necessary when the invention is to be portable. In those applications where portability is not required, a permanent fixed platform may be utilized.

The clean water tank 20 is a square, 316 stainless steel IBC tank capable of holding from about 50 to about 300 gallons of water, preferably 250 gallons. If desired, the tank may be of welded steel construction with its internal surfaces treated, as for example by tinning, to resist corrosion. As is known in the art, there are many available shapes for stainless steel tanks or totes including round, elliptical, conical, cylindrical, cone-topped, truncated, and square. In addition, single and double wall tanks, stackable tanks, and tanks made of different materials (such as aluminum or plastic) are also available and can be used in the present invention. The tank can also be outfitted with emergency vents, pumps, meters, and level indicators. To prevent jostling of liquids, the tank may be baffled. The clean water tank 20 has a closable filler aperture 23 near its roof whereby a supply of water may be filled into said tank. The tank is also provided with one or more drain plugs with sloped bottoms to allow for virtually complete drainage of the transported liquid. If desired, the clean water tank 20 may include banded or immersion heaters or panels (and sufficient tank insulation) to keep the water at proper operating temperatures, preferably from about 150 to about 200 degrees Fahrenheit, most preferably 180 degrees Fahrenheit, or as otherwise required by the appropriate Aircraft Maintenance Manual or turbine engine manufacturer. As described in more detail below, the clean water tank 20 is filled with ultra pure water with less than 0.1 parts per million Total Dissolved Solids (TDS) and near 18 MegaOhm resistivity The grey water tank 30 is also a square, 316 stainless steel IBC tank capable of holding from about 50 to about 300 gallons of water, preferably 250 gallons. It has the same characteristics of the clean water tank, with a closable filler aperture 33, one or more drain plugs, and baffles to prevent jostling of liquids. The grey water tank 30 is designed to hold the waste water effluent directed from the effluent collector 60 described below. In fact, the collector 60 may have a sump dewatering pump at its lower trough.

The wash pump 40 is a stainless steel axial piston pump such as those manufactured by Danfoss. This pump is specifically designed for high-purity water applications and is a stainless steel, high efficiency axial piston pump with high recirculating capability. The pump is designed to deliver from about 1 to about 50 gallons per minute of wash water at a pressure of from about 200 to about 725 psi. The pump's operating parameters may be adjusted by a variable-frequency drive attached to the pump's electric motor. As is known in the art, a variable-frequency drive is an electronic controller that adjusts the speed of the electric motor by modulating the power being delivered. Variable-frequency drives provide continuous control, matching motor speed to the specific demands of the work being performed. Variable-frequency drives enable pumps to accommodate fluctuating demand, running pumps at lower speeds and drawing less energy while still meeting pumping needs.

One or more additive/detergent tanks 50 can be in fluid communication with the clean water tank. These tanks are preferably 10-50 gallon stainless steel square tanks or totes with large fill openings and output ports for piping. The typical detergents, freeze depressants, corrosion inhibitors, and other additives used in this process can be obtained from manufacturers such as ZOK International Group. Preferably, these chemicals are non-flammable, environmentally friendly, and biodegradable.

Rather than being expelled directly onto the underlying surface (such as the hangar floor), the wash water and engine effluent is collected for treatment with a waste water effluent collector 60. As described in more detail below, the waste water effluent collector 60 is a mobile device that is placed under and behind the aircraft engine 160. The device captures the contaminated wash water as it exits the engine and separates the waste wash water from the air flow of the engine. The contaminated wash water is collected in a collection base pan 61 and pumped to the grey water tank 30 for later processing.

In some operating environments, the present invention will also need a power generation system 70 to power the various components discussed above. For example, if airport power is not available, a power source will be provided on the trailer 10 to run, among other things, (a) the heater for the clean water tank, (b) the water pump for the spraying steps, (c) the air purge system, (d) the active fan for the air mist eliminator, (e) the additive injector pumps, (f) the automation panel and related electronics, (g) the effluent collector bilge pump, and (h) the external lighting for night-time or low-light level operations. A suitable power generation system can include a 480 volt, 3 phase, 60 Hertz diesel engine-driven generator unit from such suppliers as Caterpillar, Honda, or Kubota. For non-US systems, the power generation system may be a different voltage, phase and frequency.

Figure 3:
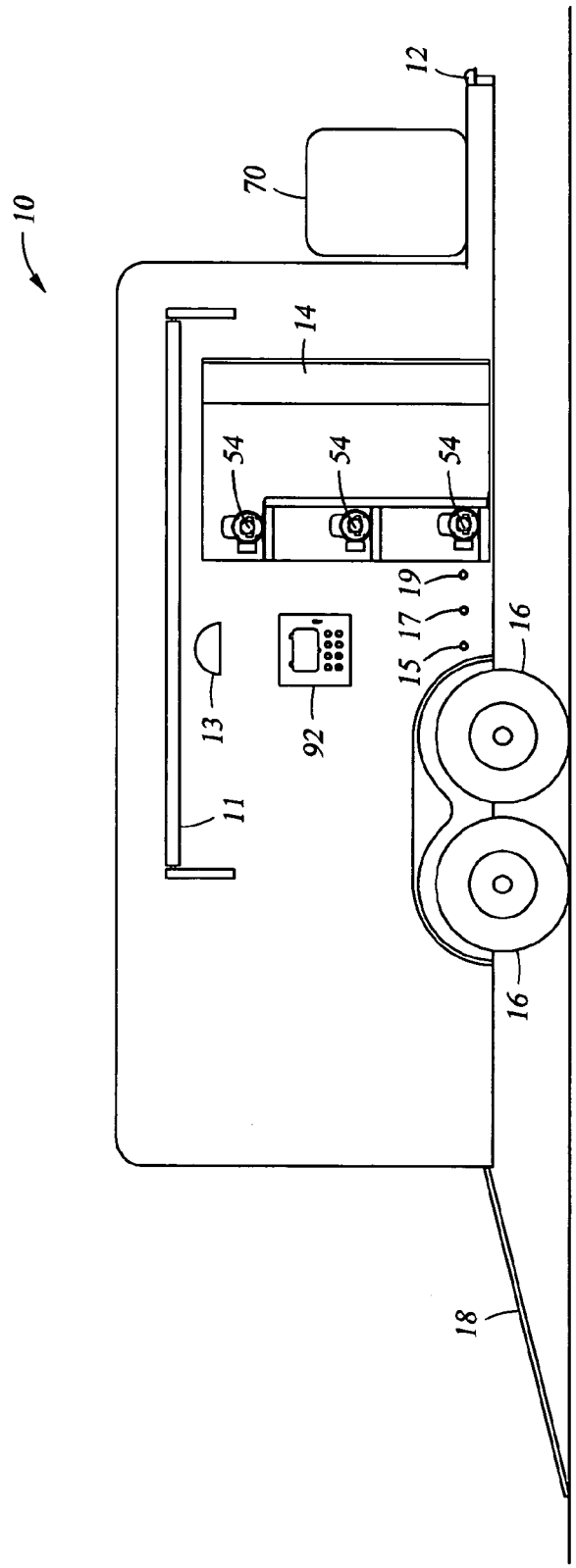
FIG. 3 is a side view of the inside of the trailer.
Figure 7:
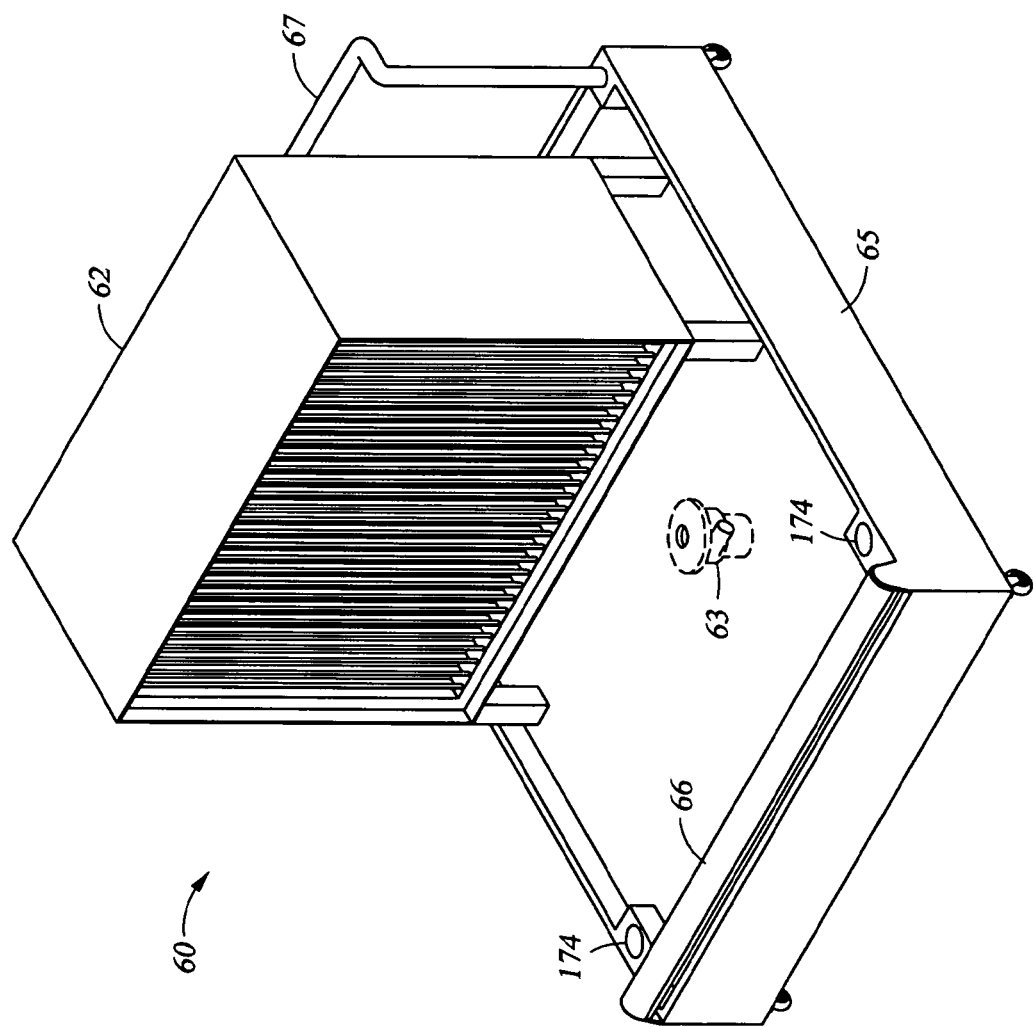
FIG. 7 is an isometric view of the wash water collection system.
Figure 8:
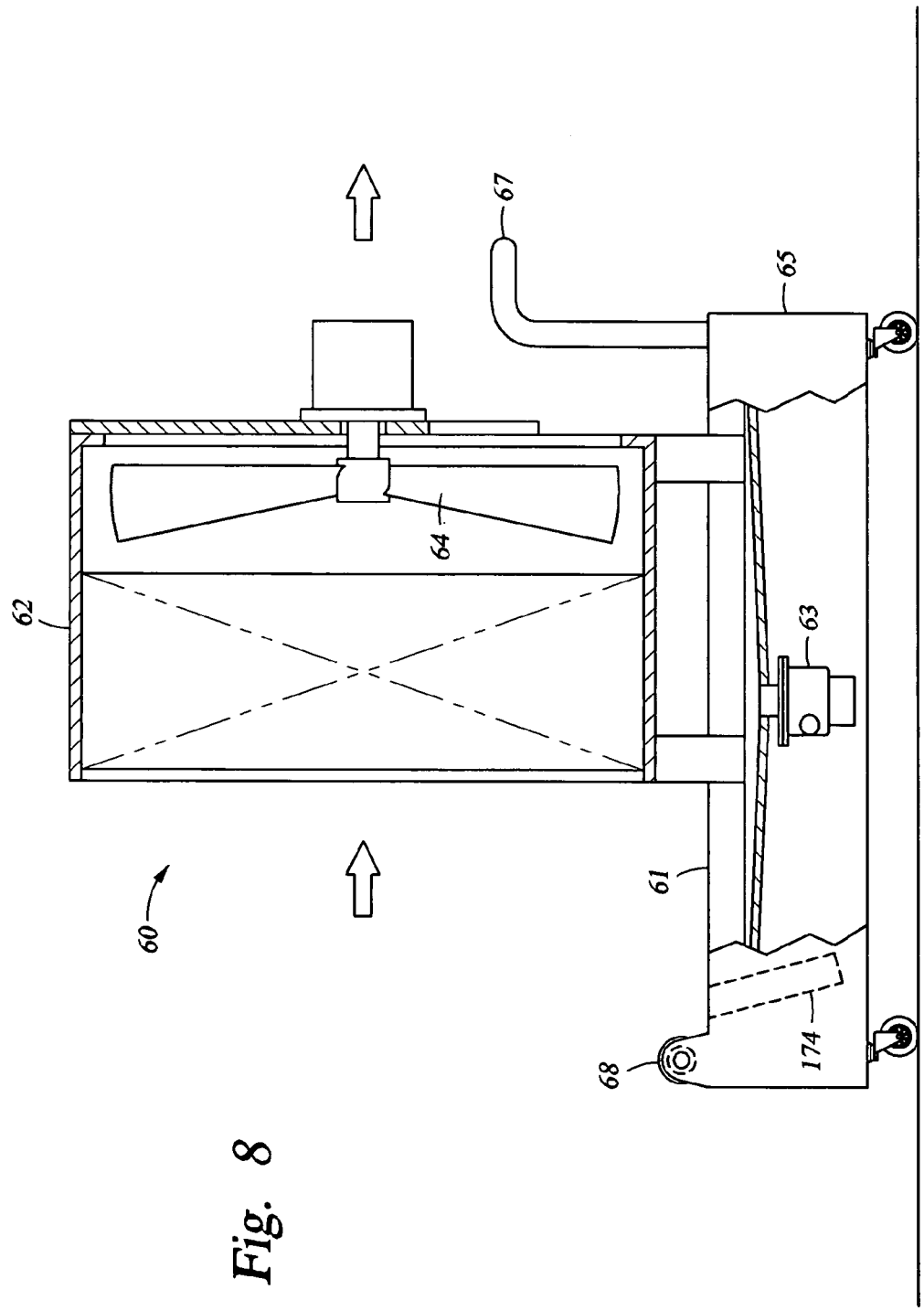
FIG. 8 is a side view of the wash water collection system, with partial cross-section.

FIG. 3 is a side view of the inside of the trailer 10. As noted above, the trailer 10 is about 20 feet in length, 6 feet in width, and includes a trailer hitch 12, one or more roll-up access or side doors 14, modular tires 16, and ramp door 18. To assist the operator of the present invention, trailer 10 can include one or more awnings 11 (for protection from sun and rain) and one or more exterior lights 13, such as 500 watt quartz lights, for night-time or low-level light conditions. In addition to the mechanic's point-of-use supply cabinet 150, one or more storage cabinets, compartments, or shelves can be integrated into the trailer side walls or otherwise provided, for the storage of a variety of equipment or tools used in the present invention. Specifically, there can be a manifold storage area, duct and hose storage area, and shelving storage area. Access to these storage areas can be obtained behind one or more roll-up doors 14 and the door ramp 18. In addition, this side view shows one or more automation panels 92 for controlling and monitoring the operation of the system—for example, the trailer can incorporate, among other automation panels and devices, a system control panel, a power generator control panel, a data logging panel, an alarm panel, and an electrical panel; all of which can be stand-alone or incorporated into one CPU-driven device.

Figure 9:
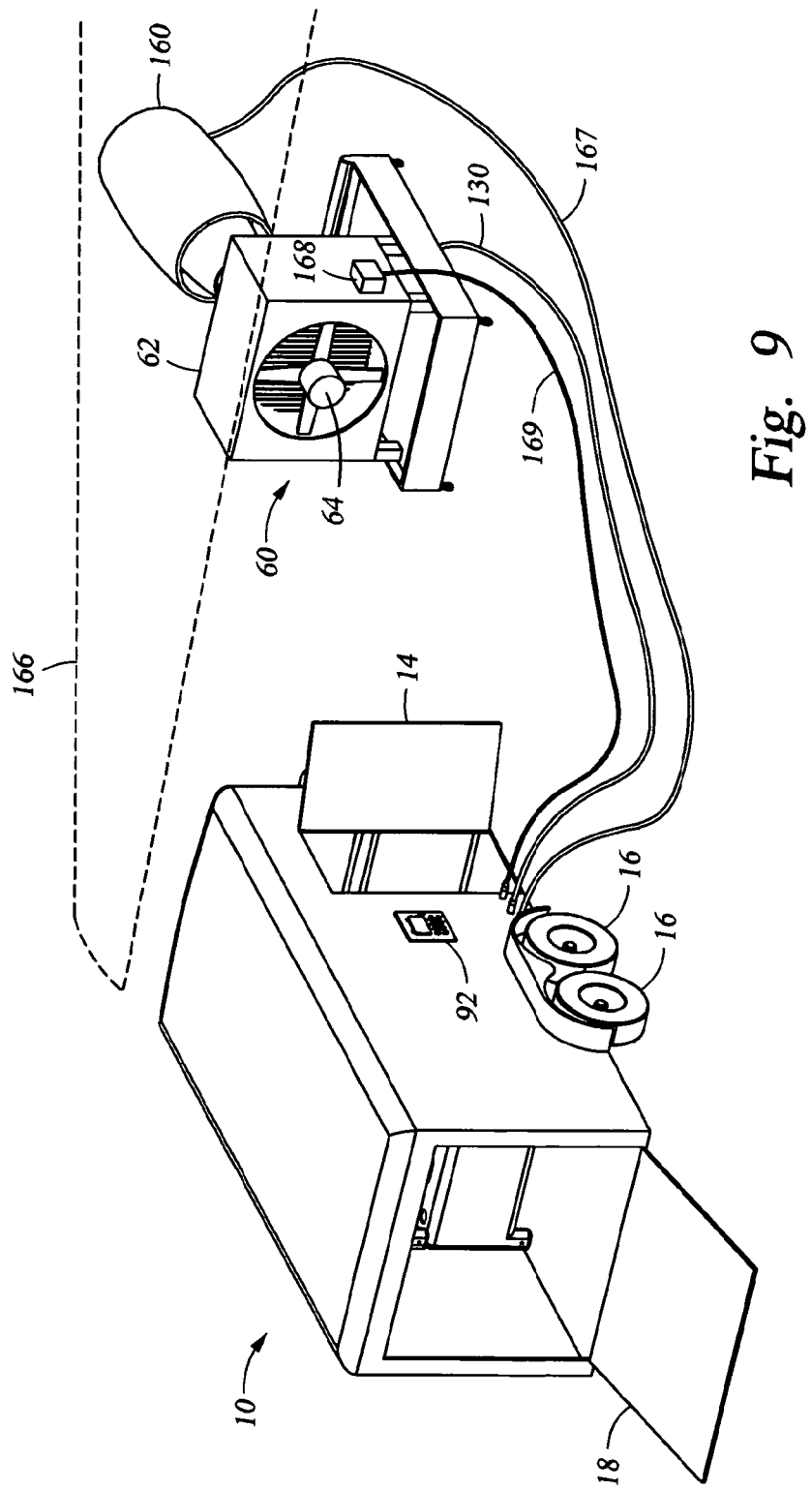
FIG. 9 is an isometric view of the trailer and the wash water collection system in association with the aircraft wing and engine.
Figure 10:
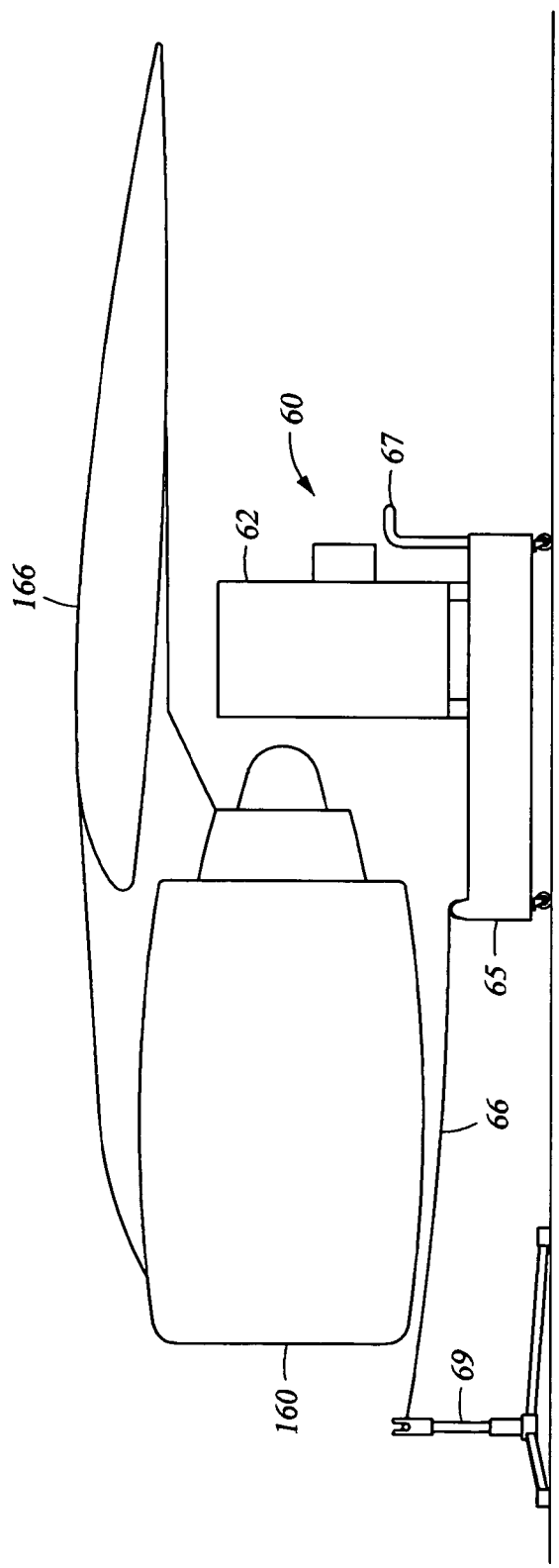
FIG. 10 is a side view of the wash water collection system in association with a low mounted aircraft engine.
Figure 11:
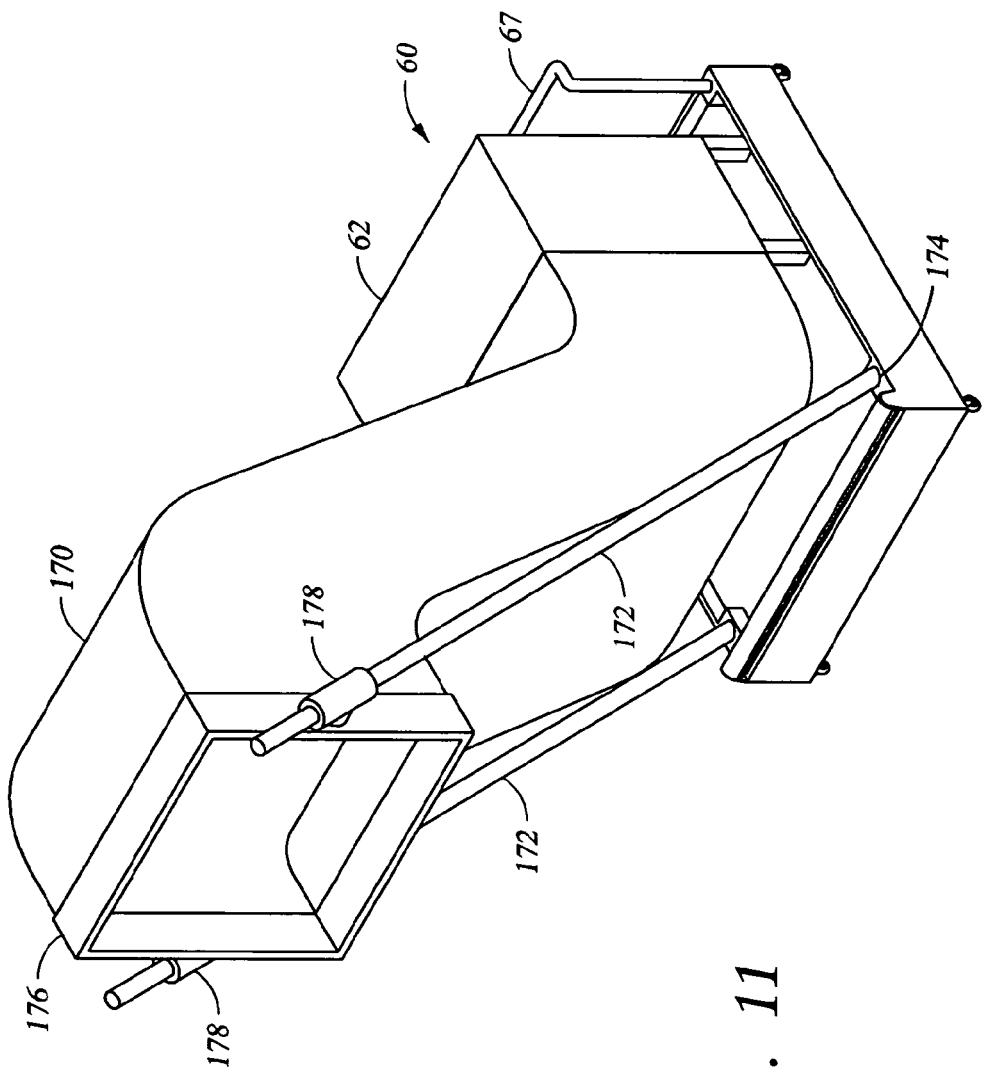
FIG. 11 is an isometric view of the wash water collection system with a chute extension for an elevated or tail mounted aircraft engine.

FIGS. 4-6 include several views of the manifold and nozzle technology; specifically, FIG. 4 is a perspective view, FIG. 5 is a front view, and FIG. 6 is a side view of the manifold and nozzle technology used in the present invention. The piping from the clean water tank 20 and chemical injection tanks 50 has connected thereto a length of flexible hose 167 (as shown in FIG. 9) for delivering the washing liquid from the trailer 10 to the aircraft for use in washing the blades of the turbine engine. The hose 167 is releasably connected to a manifold device 100 with stainless steel connectors 105 such as those manufactured by Parker or Swagelok attached to the main manifold inlet pipe 107. The manifold device may have a single spray nozzle or a plurality of spray nozzles, each with its own specific spray dispersion pattern, flowrate, and droplet size symmetrically disposed about the air intake of the combustion turbine engine. More specifically, for illustration purposes, the manifold 100 has four arms 101, 102, 103, and 104, radiating from the main manifold inlet pipe 107, with each arm having a flow meter 106 and nozzle 108. Water is sprayed under pressure from these nozzles onto the bypass turbofan blades and into the inlet of the compressor during operation.

For the nozzles directed towards the engine core, the liquid is finely-divided to a degree such that when the liquid is sprayed against and through the object, the liquid particles will follow the same routes as those earlier taken by the air-borne contaminants through the object. The engine is running during the actual cleaning process, i.e. is rotated with the aid of its start motor, for instance; this provides the air flow that is needed for the finely-divided liquid particles to follow the same route as the air-borne particles and therewith reach contamination coatings throughout the engine.

For the nozzles directed towards the bypass blades, the liquid is dispersed so as to directly impinge upon the pressure and suction side of the bypass blades.

In practice, the pressure for injecting the liquid through the spray nozzles 108 is from about 200 to about 725 psi, preferably 700 psi, with a delivery quantity of from about 1 to about 50 gallons per minute of wash water, with the exact flow rate to be determined by the requirements and specifications of the turbine manufacturer or Aircraft Maintenance Manual. The nozzle orifices are fixed at sizes ranging from 0.05 mm to 1.3 mm. The number of nozzles and radial displacement of each nozzle employed can be varied to provide the desired volume of liquid for the engine and the wash solution droplet size and spray pattern for the engine component the nozzle is targeting.

As is known in the art, the manifold and nozzle apparatus is releasably connected to the leading edge of the gas turbine engine for dispersing the cleaning or rinsing fluid to the air intake area of the engine and on into the engine's internal air flow path.

FIGS. 7 and 8 are an isometric and side view, with partial cross-section, of the wash water collection system. The collector 60 includes a commercially available air mist eliminator 62 manufactured by companies such as Koch Industries mounted in front of and ducted to a large capacity outdoor-rated electrically powered fan 64, a flexible trough 66 mounted on a roller device 68 to channel spillage and engine drain runoff, a collection base pan 61, and a marine grade bilge pump 63 mounted on the collection base pan with necessary piping and connections to the grey water holding tank 30 in the system trailer 10. All the components of the collector are mounted on a wheeled frame 65 with pull handle 67. The arrows in FIG. 8 show the direction of engine 160 exhaust air flow through the air mist eliminator 62.

FIG. 9 is an isometric view of the trailer 10 and the wash water collection system 60 in association with the aircraft wing 166 and engine 160. During operation, the clean wash water is delivered from the trailer 10 through connector 15 to hose 167 which is connected to the nozzle manifold 100 at connector 105. The hose 167 is a commercial grade, high-pressure hydraulic hose of from about ⅜ inch to about ⅞ inch diameter with a burst strength of about 2000 psi, which can be from about 25 to about 75 feet in length to reach from the trailer 10 to the aircraft engine 160. The wash fluid is expelled through nozzles 108 through the aircraft engine 160 and the resultant effluent is captured by the waste waster collection system 60. The effluent thus captured is collected and pumped via the marine grade bilge pump 63 through hose 130 to connector 17 on trailer 10 and piped to the grey water holding tank 30. Electrical power to the waste water collection system 60 is provided by electrical power cabling 169 extending from power connector 19 on trailer 10 to an electrical receptor box 168.

FIG. 10 is a side view of the wash water collection system 60 in association with a low mounted aircraft engine 160. As the effluent is being expelled by the dry-motoring or idling engine 160, the collector 60 actively assists the effluent mist by having the fan 64 suction the mist through the mist eliminator 62 where the water droplets are removed by direct impaction to the components of the eliminator 62. The water droplets are separated from the air flow in the eliminator 62 and drop to a collection base pan 61 mounted on the frame 65 of the collector 60. The now dry air flow continues through the fan 64 and is expelled into the atmosphere. Additional effluent that is expelled from the front of the engine 160, the engine sump drains and side ports, are caught in the trough 66 and channeled to the collection base pan 61. As seen in FIG. 10, the trough 66 is supported at its front by one or more support tripods 69. The collected effluent in the collection base pan 61 is pumped, via a mounted bilge pump 63, to the grey water holding tank 30 in the system trailer 10.

FIG. 11 is an isometric view of the wash water collection system with a chute extension for an elevated or tail mounted aircraft engine. The air mist eliminator 62 has a diameter just slightly larger than the rear exhaust of the turboengine 160; for engines mounted higher than the mist eliminator 62, a flexible, liquid-impervious connector duct 170 is attached to the mist eliminator 62 and is positioned behind the engine 160 exhaust. The flexible duct 170 is supported in the air by two or more adjustable support poles 172 removably mounted on the cart frame 65 of the wash water collection system 60 by insertion into one or more stanchions 174. The flexible duct frame 176 is slightly larger than the exhaust section of the engine 160 and can be of any geometric shape. The poles 172, which are terminated on the duct frame 176 with mounted pole brackets 178, can be height adjusted by various means described in existing art.

Figure 12:
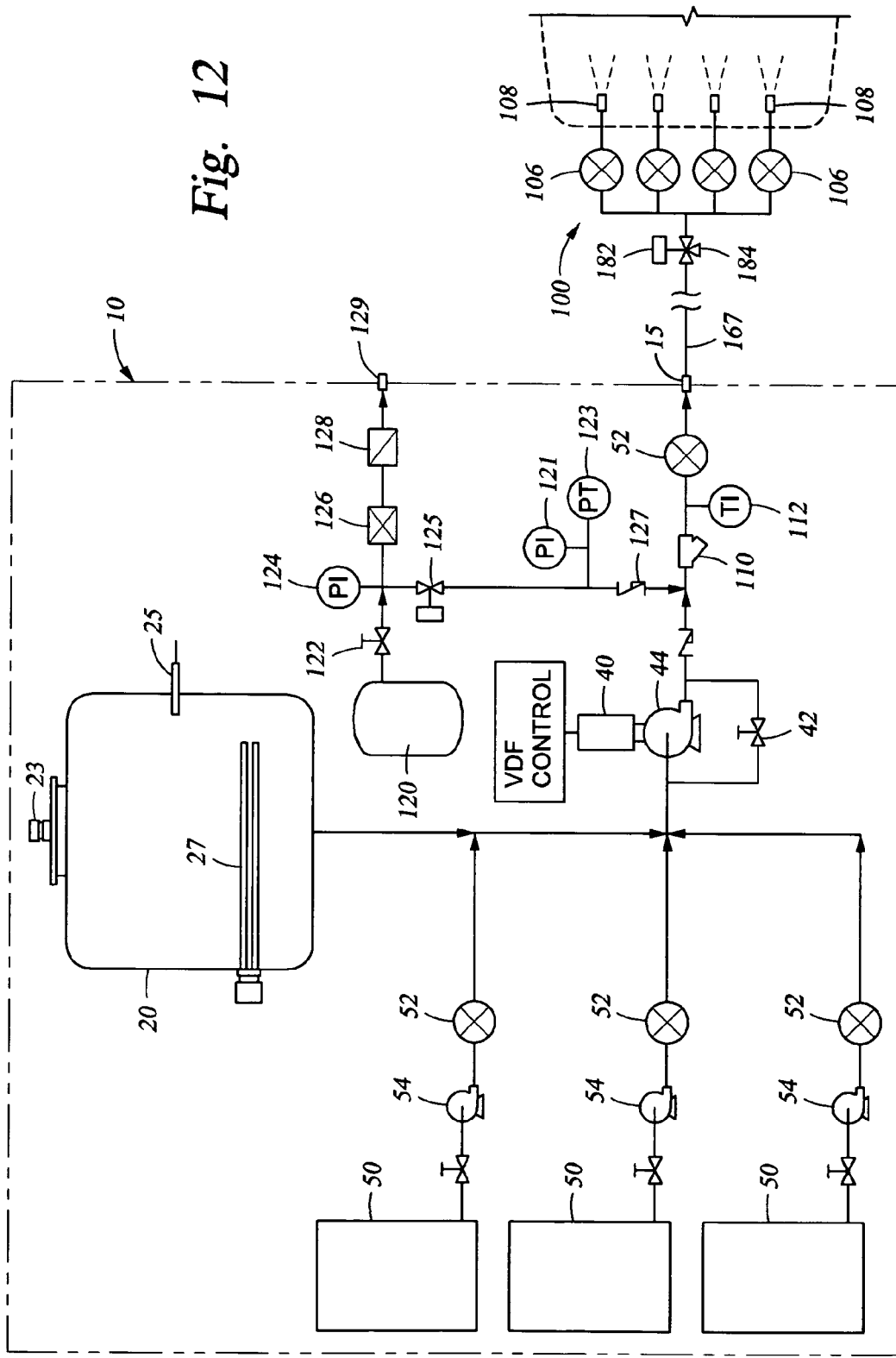
FIG. 12 is a schematic of the plumbing, piping, and instrumentation of the present invention from the clean water tank to the nozzle manifold, along with the air purge system.

FIG. 12 is a schematic of the plumbing, piping, and instrumentation of the present invention associated with the clean water tank 20 and the air purge system, with the components inside the outer rectangle being found inside the trailer 10. The clean water tank 20 has a closable filler aperture 23 near its roof whereby a supply of wash water may be filled into the tank. Here, the preferred wash water is ultra pure water with less than 0.1 parts per million Total Dissolved Solids (TDS) and near 18 MegaOhm resistivity.

Of course, the use of ultra pure water necessitates the use of high-purity water pipe, fittings, and valves. For best results, the ultra pure water is added to the clean water tank 20 no more than about four hours before the washing process takes place. In addition, a resistivity meter or conductivity probe 25 can be used to monitor the purity of the wash water. The clean water tank 20 may include banded or immersion heaters or panels 27 (and sufficient tank insulation) to keep the water at proper operating temperatures.

FIG. 12 shows one or more additive/detergent tanks 50 in fluid communication with the clean water tank 20. In each case, the additive or detergent or other chemical of interest can be stored in its own storage tank 50 mounted to the trailer 10, ready to be mixed with the wash water from the clean tank 20, by means of a valve or flow meter 52 and chemical injection pump 54 that may be controlled by a variable frequency drive (VFD) and a programmable logic controller. Each additive/detergent tank 50 will have its own pump 54, such as a Webtrol booster pump from Weber Industries.

The additive or detergent used depends upon the amount and type of fouling found in the engines, the operating environment of use, and the degree of cleaning required. For example, one or more cleaning solutions or detergents can be added to the wash water to assist in the efficacy and efficiency of the cleaning process. Any conventional cleaning solution appropriate for removal of the specific contaminants in the compressor section, typically oils, greases, dust, and entrapped particulates may be employed. Those skilled in the art are adept at selecting, preparing, and producing such solutions in the desired consistency. Moreover, water alone can be used only when certain environmental conditions are met. In particular, when ambient temperatures are below 45 degrees Fahrenheit, there is a strong likelihood that the water will freeze, thereby creating ice formations that can damage the compressor and associated inlet guide vanes, which are expensive to manufacture and replace. In an attempt to increase the temperature range within which water can be used, freeze depressant additives can be mixed with the water to lower its freezing point.

In certain situations it may be necessary to employ a corrosion resistance additive if the engine will not be utilized for a specified length of time.

If desired, other additives can be injected into the engine to facilitate reducing a rate of formation of particulate matter within the gas turbine engine. More specifically, an anti-static liquid that coats compressor blades within the gas turbine engine to facilitate suppressing static charges from developing within the compressor blades can be employed.

As seen in FIG. 12, the clean water tank 20 and additive/detergent tanks 50 are in fluid communication with the wash pump 40. The pump 40 has a pressure control valve 42 and a variable-frequency drive controller 44 attached to the pump's electric motor to adjust the pump's operating parameters. The piping from the pump 40 to the nozzles includes a strainer 110, temperature indicator 112, and flow meter 52. As is known in the art, strainers are placed in-line with process piping to remove large solid contaminants from the flow.

FIG. 12 also shows the plumbing, piping, and instrumentation for the air purge system, specifically, an air compressor 120, air regulator 122, pressure gauge 124, compressed air filter 126, and compressed air dryer 128. There is also a pressure gauge 121, pressure transmitter 123, purge solenoid valve 125, and purge check valve 127 in fluid communication with the plumbing for the wash pump. The purpose of this apparatus is to force instrument quality air through the lines post-wash to flush any remaining wash solution, thereby reducing the possibility of line corrosion or wash solution contamination. The post-wash purge may be through the nozzle apparatus or through a separate electrically controlled solenoid three-way valve 182 connected to a drainpipe or hose 184. The instrument quality air is also used by the system operators to purge any remaining wash solution from the turboengine components such as passenger air bleed systems and the like through connector 129.

Figure 13:
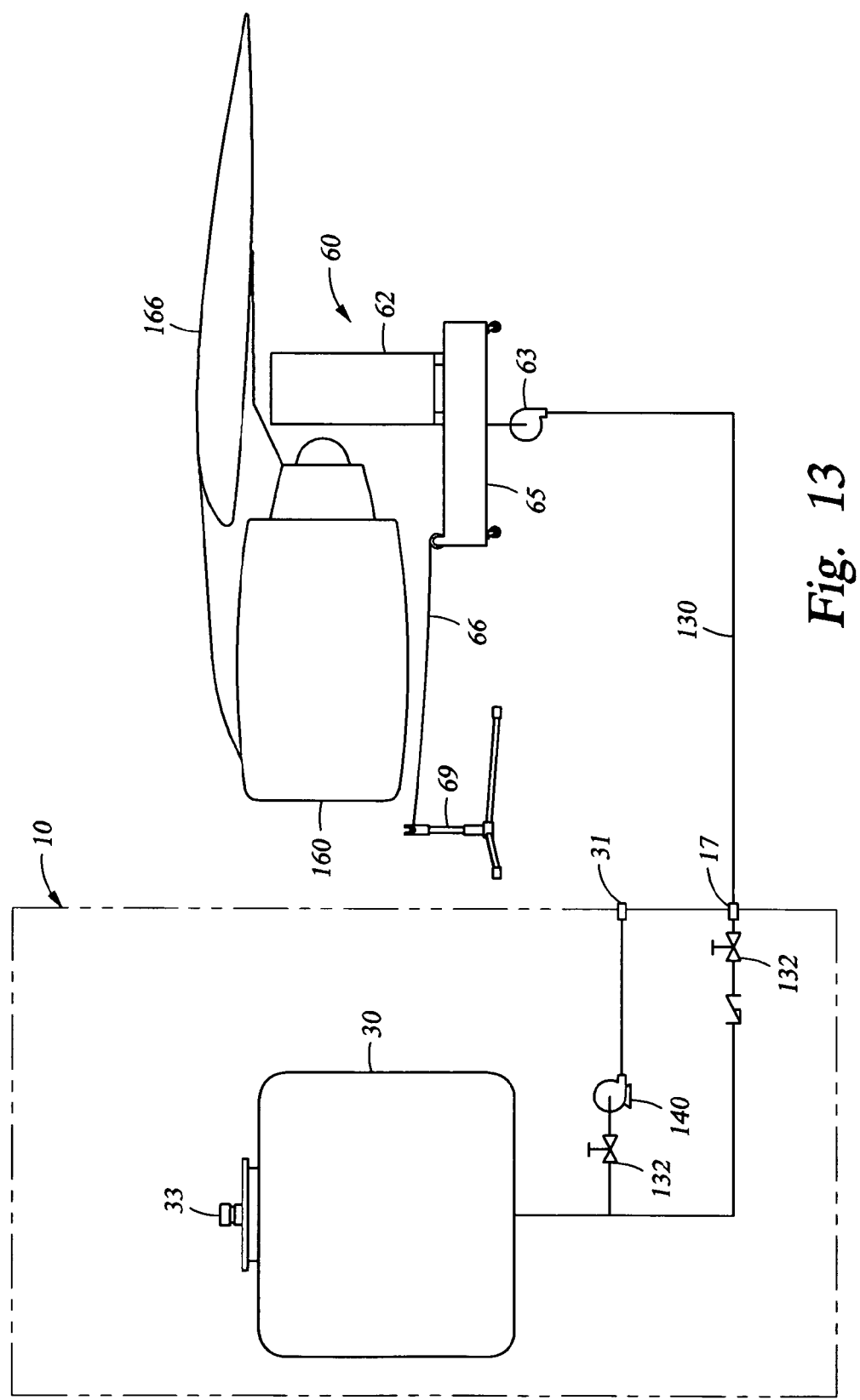
FIG. 13 is a schematic of the plumbing, piping, and instrumentation of the present invention from the wash water collection system to the grey water tank.

FIG. 13 is a schematic of the plumbing, piping, and instrumentation of the present invention associated with the grey water tank, with the components inside the outer rectangle being found inside the trailer 10. The waste water effluent collector 60, which has a marine grade bilge (sump) dewatering pump 62, is in fluid communication with the gray tank 30 by means of a return hose 130 and associated valves 132. As is known in the art, sump pumps are used in applications where excess water must be pumped away from a particular area. They generally sit in a basin or sump that collects this excess water, hence the name basin sump pump, or simply sump pump. When selecting between the available styles of sump pumps, the most important specifications to consider include the size of the pump and the size of the sump pump pit into which it will be placed, as well as maximum discharge flow, maximum discharge pressure, discharge size, and media temperature. Once filled, the grey water tank 30 can be emptied by means of a transfer pump 140 through connector drain 31. The grey water effluent is then available for disposal or further processing in an environmentally safe manner.

Operation of Invention

The procedures for washing engines are specified by the turbine manufacturers or the Aircraft Maintenance Manual. In general, the cleaning composition is applied to the deposits on the turbofan blades and internal engine components by spraying into the engine from about 30 seconds to about 5 minutes, preferably three one minute intervals. The engine may be turned by hand (windmilled) or run using the starter motor alone during application to further promote uniform distribution of the cleaning composition within the engine. The cleaning composition is allowed to soak into the deposits for about 2 to 5 minutes, which allows surface reactions to occur. To properly clean an aircraft engine, about 3 to 5 such application and soak steps are cyclically repeated to assure adequate dislodging of the deposits from the engine components. Of course, the method of application and number of application and soak steps will vary depending on the engine type, severity of deposit accumulation, and resistance to removal. In non-aircraft applications, the procedures for on-line and off-line washing of the turbine compressor outlined by the turbine manufacturers are followed.

Rinsing may be required to remove both the cleaning composition and loosened deposits from the engine. A rinse solution may be applied in a similar cyclic application and soak pattern. Using water as the preferred rinsing agent, a 30 second application, while windmilling, followed by soaking for 1½ minutes and then repeating for about 3 to 8 cycles will provide adequate rinsing. As will be understood by those skilled in the art, any rinsing means which sufficiently removes residual cleaning composition and loosened deposits from the engine may be used.

The present invention will allow for the introduction of certain additives into the wash solution by injection into the suction input plumbing or high pressure output of the main wash delivery pump. Additives required will be injected in precise operator-specified quantities and flow rates for specific time durations controlled by the system automation devices.

The present invention will use a feed-back automation system with electronic controllers to adjust the pressure, flow rate, temperature, and duration of the water wash system. The wash procedure needed for each engine type and for specific applications will be specified in a proprietary computer program running on the system. The operator will input the necessary information and the system will begin operation according to the required parameters. Of course, manual override and emergency stop procedures will be allowed.

While not required, sampling of the resulting effluent liquid may be periodically conducted during the cleaning operation for analysis of suspected contaminants. Upon determining that the concentration of one or more selected contaminants in the effluent has dropped below predetermined values, the cleaning operation can be modified. The constituent contaminants, the degree of contamination, the selected solvents, the concentration thereof, and the operating temperature all affect the cleaning time and efficacy.

After the cleaning and rinsing steps are completed, and the waste water effluent collected, the manifold and nozzles are then removed and stowed in the trailer, and the engine prepared for operation utilizing the instrument air purge. The engine is then run-dried as per the specifications and requirements of the turboengine manufacturer or the Aircraft Maintenance Manual Although the present invention and its advantages have been described in detail, it should be understood that various changes, substitutions, and alterations could be made herein without departing from the spirit and scope of the invention as defined by the appended claims.

What is claimed is:

1. An apparatus for cleaning gas turbine engines, comprising:
   means for pressurizing a wash fluid, wherein said means comprises a low-pressure fluid delivery system;
   means for incorporating additives and/or detergents into the wash fluid; and
   a manifold and injection nozzle assembly, having a plurality of nozzles mounted on a moveable manifold that is fluidly connected to a source of wash fluid, the manifold positionable directly in front of an air inlet of a gas turbine engine for delivering the wash fluid into the air inlet of the gas turbine engine and connectable to the gas turbine engine, wherein the manifold and injection nozzle assembly is configured to deliver the wash fluid in at least one finely divided spray, with the wash fluid at each nozzle at a corresponding pressure of about 200 psi to about 725 psi and a total delivery rate through all of the nozzles of about 1 gallon per minute to about 50 gallons per minute, and wherein at least one of the nozzles has a first configuration that produces a first spray as to droplet size, flowrate, and dispersion spray pattern, and wherein at least one other of the nozzles has a second configuration, different from the first configuration, that produces a second spray, different from the first spray, as to droplet size, flowrate, and dispersion spray pattern.

2. The apparatus of claim 1 further comprising:
   means for purging the wash fluid from the engine cleaning apparatus.

3. The apparatus of claim 1 further comprising:
   means for controlling the engine cleaning apparatus.

4. The apparatus of claim 3 wherein said control means is an electronic microprocessor control, feedback, data storage, and application programming system.

5. The apparatus of claim 1 further comprising:
   a portable power generator that will power the engine cleaning apparatus.

6. The apparatus of claim 1 wherein said additives and/or detergents are selected from the group consisting of cleaning solutions, foaming agents, detergents, freeze depressants, emulsifiers, corrosion inhibitors, and anti-static additives.

7. The apparatus of claim 1 wherein said means for pressurizing a wash fluid comprises:
   a tank for holding the wash fluid;
   means for heating and maintaining the temperature of the wash fluid;
   a motor controlled pump;
   plumbing from the tank to a motor controlled pump;
   a flow control mechanism; and
   plumbing from the pump towards the engine.

8. The apparatus of claim 7 wherein said means for heating and maintaining the temperature of the wash fluids heats and maintains said wash fluid to a range from about 150 degrees to about 200 degrees Fahrenheit.

9. The apparatus of claim 7 wherein the means for heating and maintaining the temperature of the wash fluid comprises tank band heaters, immersion heaters or panels.

10. The apparatus of claim 7 further comprising: means for purging the wash fluid from the plumbing from the pump towards the engine.

11. The apparatus of claim 1 wherein said means for incorporating additives and/or detergents into the wash fluid comprises:
   one or more tanks for holding the additives and/or detergents;
   a motor controlled pump for each tank;
   plumbing from each tank to its corresponding motor controlled pump; and
   plumbing from each pump into the pressurized aqueous wash fluid plumbing.

12. The apparatus of claim 11 wherein said additives and/or detergents are selected from the group consisting of cleaning solutions, foaming agents, detergents, freeze depressant, emulsifiers, corrosion inhibitors, and anti-static additives.

13. The apparatus of claim 1 further comprising: means for purging the wash fluid from the manifold array and nozzles.

14. The apparatus of claim 13 wherein said means for purging comprises: a compressed air source which is activated at the end of the wash cycle to flush the wash fluid from the wash delivery pump, the manifold array and nozzles and/or the plumbing.

15. The apparatus of claim 1, wherein the first spray as to droplet size, flowrate, and dispersion spray pattern is adapted for finely-divided spray to a core of the gas turbine engine, and wherein the second spray has unique characteristics as to droplet size, flowrate, and dispersion spray pattern for direct impingement on bypass blades of the gas turbine engine.

16. An apparatus for cleaning gas turbine engines, comprising:
- means for pressurizing a fluid, wherein said means comprises a low-pressure fluid delivery system operating from about 200 psi to about 725 psi;
- means for incorporating additives and/or detergents into the fluid by injection of additives and/or detergents into the fluid after pressurization; and
- a manifold and injection nozzle assembly, having a plurality of nozzles mounted on a moveable manifold that is fluidly connected to a source of fluid, the manifold positionable directly in front of an air inlet of a gas turbine engine for delivering the fluid into the air inlet of the gas turbine engine and connectable to the gas turbine engine, wherein said nozzles are arranged on a manifold array with each nozzle having different configurations to produce associated unique spray characteristics as to droplet size, flowrate, and dispersion spray pattern, with at least one of said nozzles configured to deliver the wash fluid in a finely divided spray, and wherein the manifold and injection nozzle assembly is further configured to have wash fluid passing through each nozzle at a corresponding pressure of about 200 psi to about 725 psi and a total delivery rate through all of the nozzles of about 1 gallon per minute to about 50 gallons per minute, and wherein the plurality of nozzles each have a fixed size orifice ranging from 0.05 mm to 1.3 mm.

17. The apparatus of claim 16, wherein a first of the nozzles has unique characteristics to provide finely-divided spray to a core of the gas turbine engine located remote from the first of the nozzles, and wherein a second of the nozzles has unique characteristics for direct impingement on bypass blades of the gas turbine engine located in close proximity to the second of the nozzles.

* * * * *